US011585386B2

(12) United States Patent
Sanzone et al.

(10) Patent No.: US 11,585,386 B2
(45) Date of Patent: Feb. 21, 2023

(54) QUICK CONNECT FOR CONDUITS

(71) Applicant: Ford Global Technologies, LLC, Dearborn, MI (US)

(72) Inventors: Tara Sanzone, Gustavo A. Madero (MX); Jose Quezada, Tlalnepantla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 462 days.

(21) Appl. No.: 16/786,144

(22) Filed: Feb. 10, 2020

(65) Prior Publication Data

US 2021/0246949 A1   Aug. 12, 2021

(51) Int. Cl.
| | |
|---|---|
| *F16D 3/06* | (2006.01) |
| *F16D 3/26* | (2006.01) |
| *F02M 35/10* | (2006.01) |
| *F16L 37/252* | (2006.01) |

(52) U.S. Cl.
CPC ......... *F16D 3/06* (2013.01); *F02M 35/10144* (2013.01); *F16D 3/265* (2013.01); *F16L 37/252* (2013.01)

(58) Field of Classification Search
CPC ..... F16D 3/06; F16D 3/265; F02M 35/10144; F16L 37/252; F16L 2201/10; F16L 37/088; F16L 37/44; F16L 37/244; F16L 37/248
See application file for complete search history.

(56) References Cited

U.S. PATENT DOCUMENTS

| | | | | |
|---|---|---|---|---|
| 1,615,595 | A * | 1/1927 | O'Connor | F16L 37/24 285/354 |
| 3,219,364 | A * | 11/1965 | Wooldridge | F16L 37/252 285/376 |
| 9,541,226 | B2 | 1/2017 | Saunders et al. | |
| 9,657,878 | B2 | 5/2017 | Hartmann | |
| 2008/0295279 | A1* | 12/2008 | Alamond | F16L 37/252 15/330 |
| 2013/0280970 | A1* | 10/2013 | Clarkson | B63H 20/245 440/88 A |

FOREIGN PATENT DOCUMENTS

| | | |
|---|---|---|
| AT | 512397 A4 | 8/2013 |
| CN | 202914941 U | 5/2013 |
| DE | 102013100033 A1 | 7/2013 |

OTHER PUBLICATIONS

Sanzone, T. et al., "Quick Connect for Hose System," U.S. Appl. No. 16/773,068, filed Jan. 27, 2020, 42 pages.

* cited by examiner

*Primary Examiner* — Syed O Hasan
(74) *Attorney, Agent, or Firm* — Vincent Mastrogiacomo; McCoy Russell LLP

(57) ABSTRACT

Method and system are provided for a quick connector for coupling conduits. The quick connector comprises a first piece including a radial slot and a first protrusion group, a second piece including a first slot group and a second slot group angled in a same direction, the first slot group is counterpart to the first protrusion group, and a third piece including a second protrusion group counterpart to the second slot group, where each slot of the first slot group faces a first side, and each slot of the second slot group faces an opposing, second side. In one example, the quick connector may include a locking mechanism and a feedback system.

18 Claims, 10 Drawing Sheets

QUICK CONNECT FOR CONDUITS

FIELD

The present disclosure relates generally to a hose/duct connector system, and in an example relates to a hose/duct connector system for use in an air induction system of an automotive engine of a vehicle.

BACKGROUND/SUMMARY

Various systems use ducts to route gases. As an example, an automotive internal combustion engine uses an air intake system to provide airflow to the engine. The air induction system may use connectors to couple air inlet ducts or other conduits configured to supply air, e.g. a connector may couple an inlet duct to a charged air cooler. Likewise, connectors may also be used to join conduits in the exhaust gas circulation system of a vehicle.

One connector system is shown by Hartmann in U.S. Pat. No. 9,657,878. Therein, a plug connection assembly is described to connect lines for pressurized liquids or gases. A locking mechanism includes a first plug connector, a second plug connector, and a spring fastened to the first plug connector that engages in a groove of the second plug connector. Another connector system is shown by Saunders et al. in U.S. Pat. No. 9,541,226. Therein a clamp is described to connect conduits. A circular band configured to have a bolt and a bolt housing is used to clamp a conduit.

However, the inventors herein have identified potential problems in the approaches such as those noted above. As one example, a custom machine is required in order to assemble plug connectors to each conduit correctly. This not only implicates extra costs but also increases complexity on the supplier's facilities since machinery need trained personnel, designated floor area and increments in the number of operations. Clamps need a flexible material or a cuff placed between two rigid conduits in order to seal properly. Nonetheless, clamps require additional tools for their assembly that adds operations and leads to complicated packaging. Moreover, poorly connected clamps and plug connectors may deflect the orientation or the original position of the conduit. Also, without sufficient feedback designed to indicate to the operator whether the clamp or plug connector is properly locked, misconnections may occur. Furthermore, plug connectors can create rattle noises that affect NVH targets and customer perception.

The inventors herein have recognized the above issues, and others, and have developed an example coupler which comprises a first piece including a radial slot and a first protrusion group, a second piece including a first slot group and a second slot group both angled in a same direction, the first slot group is counterpart to the first protrusion group, and a third piece including a second protrusion group counterpart to the second slot group, where each slot of the first slot group faces a first side, and each slot of the second slot group faces an opposing, second side.

In an example, a quick connector configuration may include a locking mechanism and a feedback system.

The quick connector may comprise a first cylindrical piece, a second cylindrical piece, and a third cylindrical piece, with each optionally made of two sections that are circumferentially offset from each other. The second cylindrical piece has a first and second groups of multiple external latching slots facing opposite sides of the cylinder. The first cylindrical piece has internal flanges corresponding to the first group of latching slots such that the first and second pieces may be pushed against each other to create a partial overlapping assembly. The third cylindrical piece has internal flanges corresponding to the second group of latching slots such that the third piece may be assembled onto the second piece to create a full assembly. In a fully assembled quick connector, the second cylindrical piece is completely overlapped by the first and third cylindrical pieces. Additionally, a section of the third cylindrical piece also overlaps a region of the first cylindrical piece comprising an external radial slot. This provides a sealing interface.

The second cylindrical piece is configured in a way such that it is forced to rotate when engaging with the first cylindrical piece and the third cylindrical piece to lock/unlock in order to provide serviceability, without requiring rotation of the first and third pieces. In the example where the first and third pieces are already coupled with hose sections (e.g., of an air induction system of the vehicle), the connection is thus provided without requiring those hose section to rotate (e.g., if they are already installed in a system such as in the vehicle).

Further still, a "click" sound and/or feel provides feedback that the quick connector is properly locked. According to the present disclosure, the assembly of the three cylindrical pieces of the quick connector does not require any special tools or custom machine. Therefore, it is a fast, easy, simple, and reliable assembly process with reduced costs. Additionally, the haptic feedback in the form of a "click" sound and/or feel indicates that the connection was successful.

In an air induction system, the quick connector may be applied to both low pressure and high pressure systems. In one example, the first and the third cylindrical pieces of the quick connector may be integrally molded into air induction conduits to reduce the number of parts. The quick connector of the present disclosure may also be able to replace clamps and various other connectors in systems and/or commodities or even outside of the automotive industry. For example, the present disclosure may be applied to home HVAC (heating, ventilation, and air conditioning) system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-9 are shown to scale, although other relative dimensions may be used if desired.

DETAILED DESCRIPTION

Figure 1:
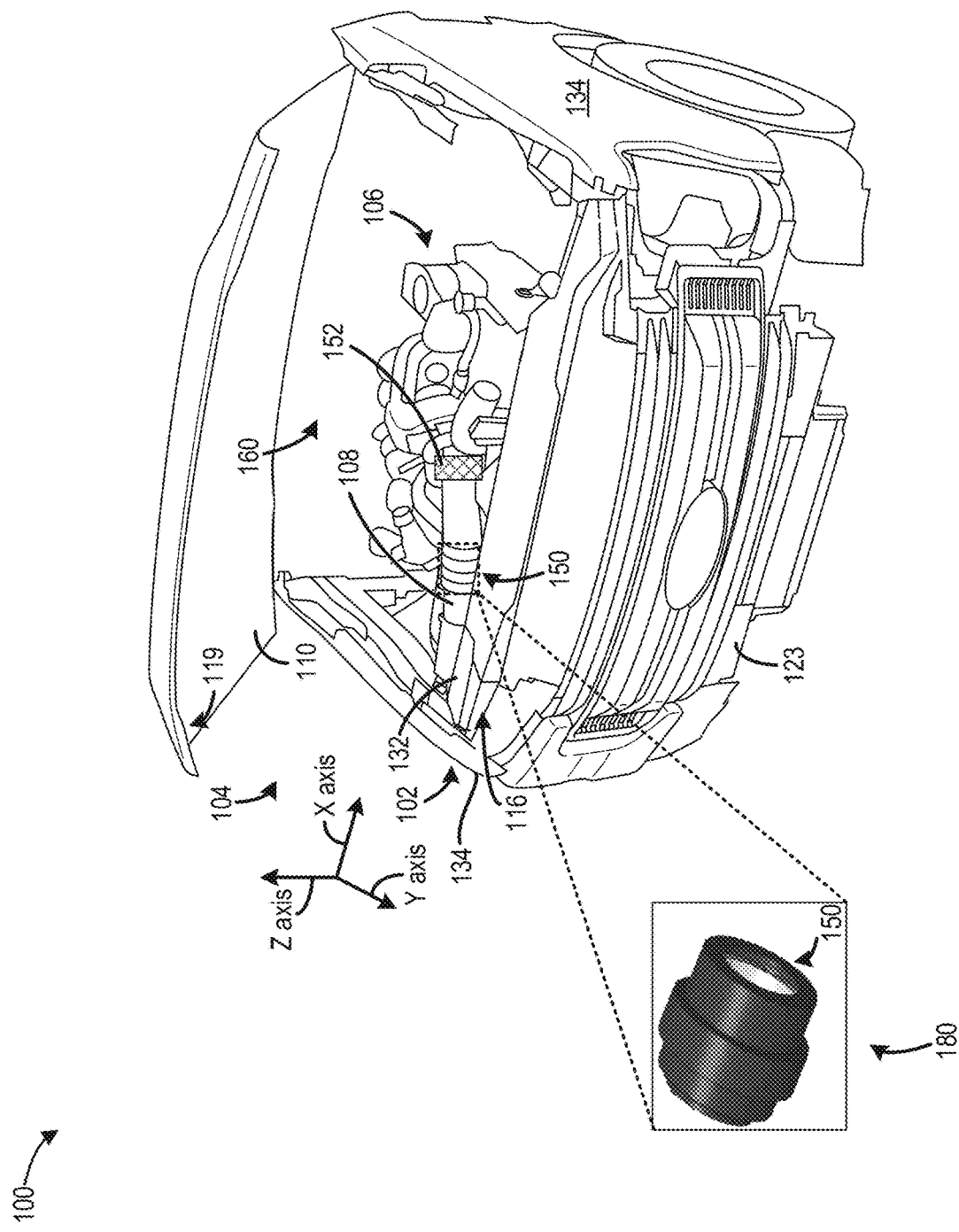
FIG. 1 shows a perspective view of an exemplary vehicle including an air intake system with a quick connector.
Figure 2:
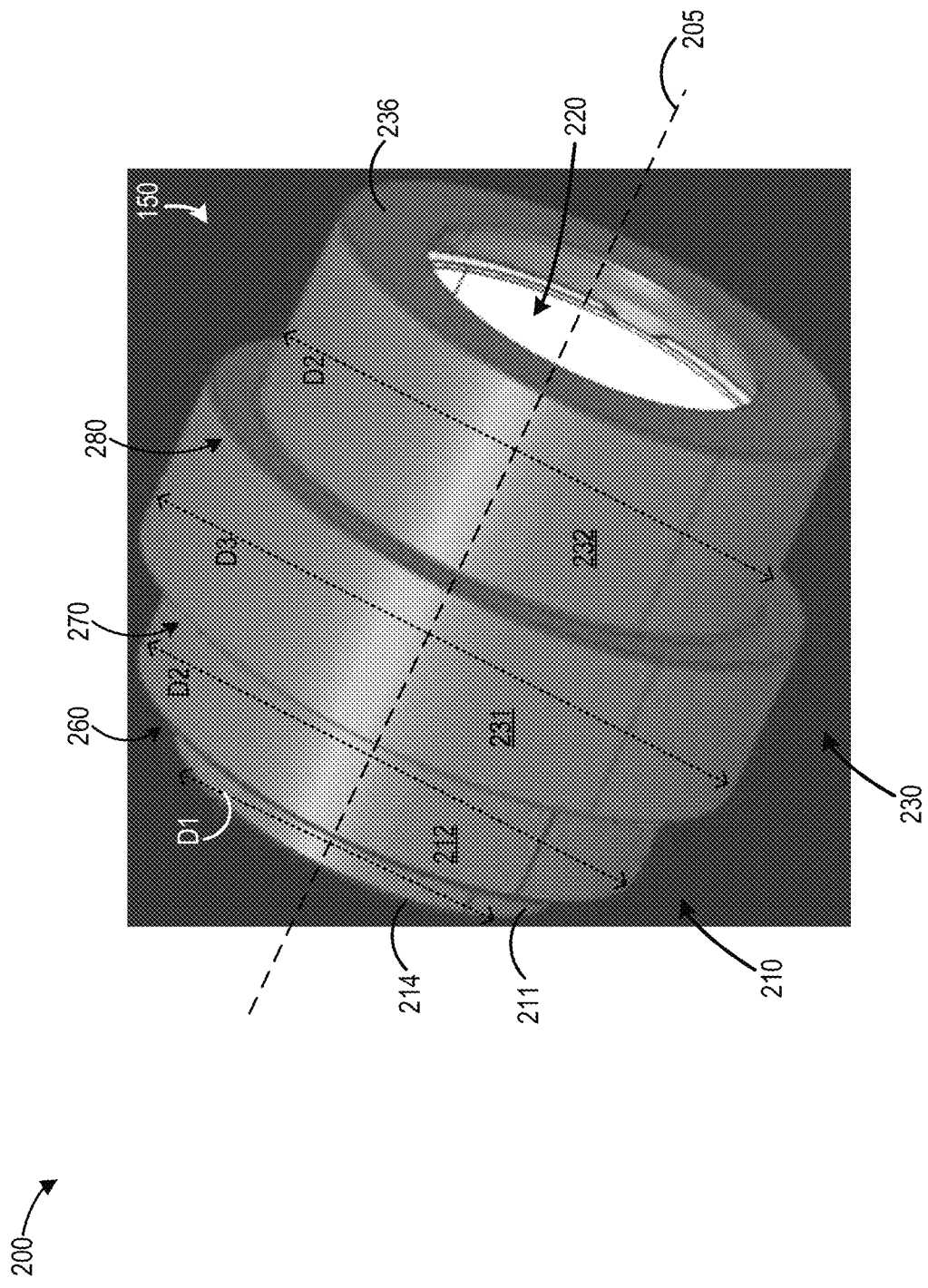
FIG. 2 is a perspective view of an assembled quick connector assembly in accordance with an example of the present disclosure.
Figure 3:
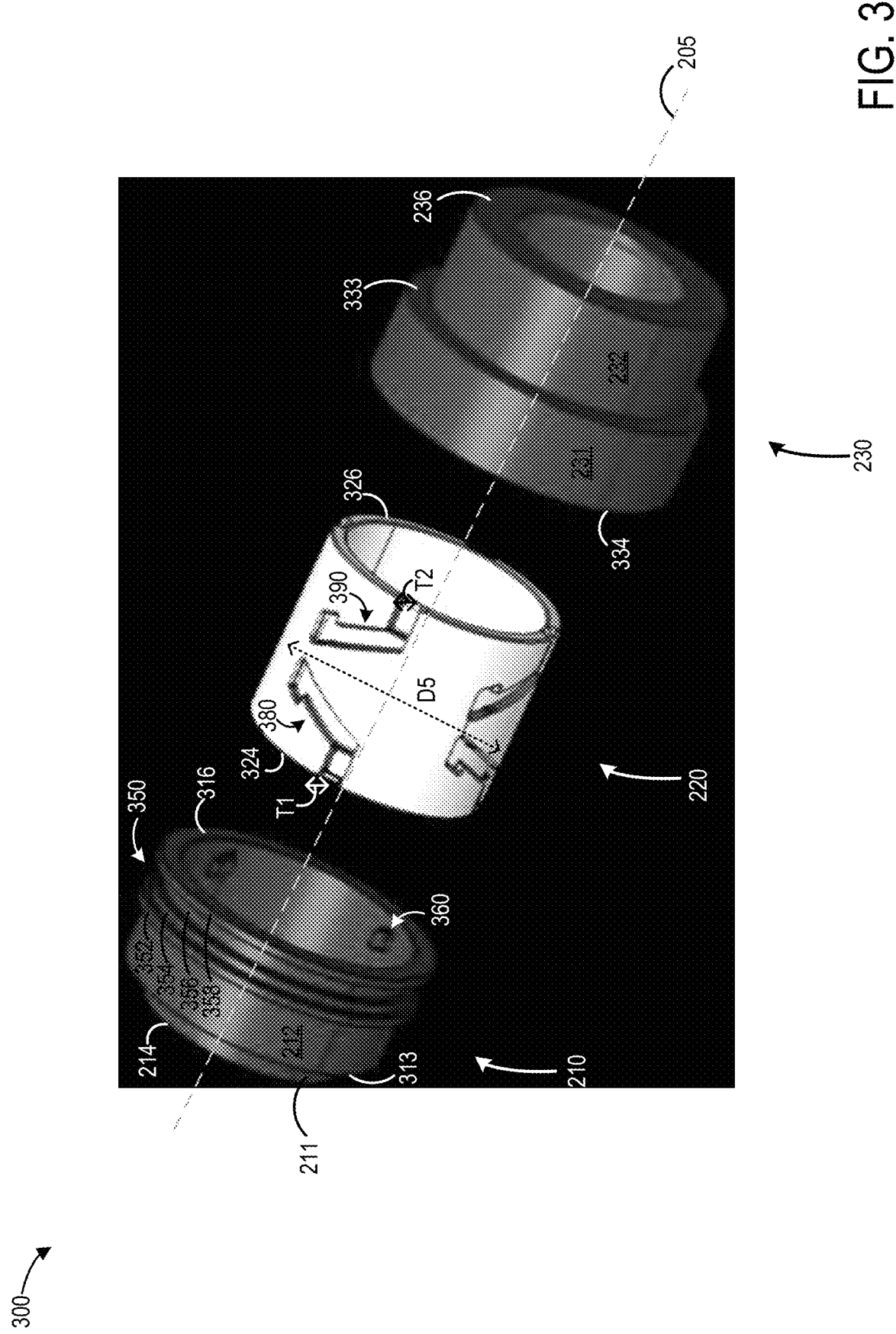
FIG. 3 is a perspective exploded view of the quick connector assembly of FIG. 2.
Figure 4:
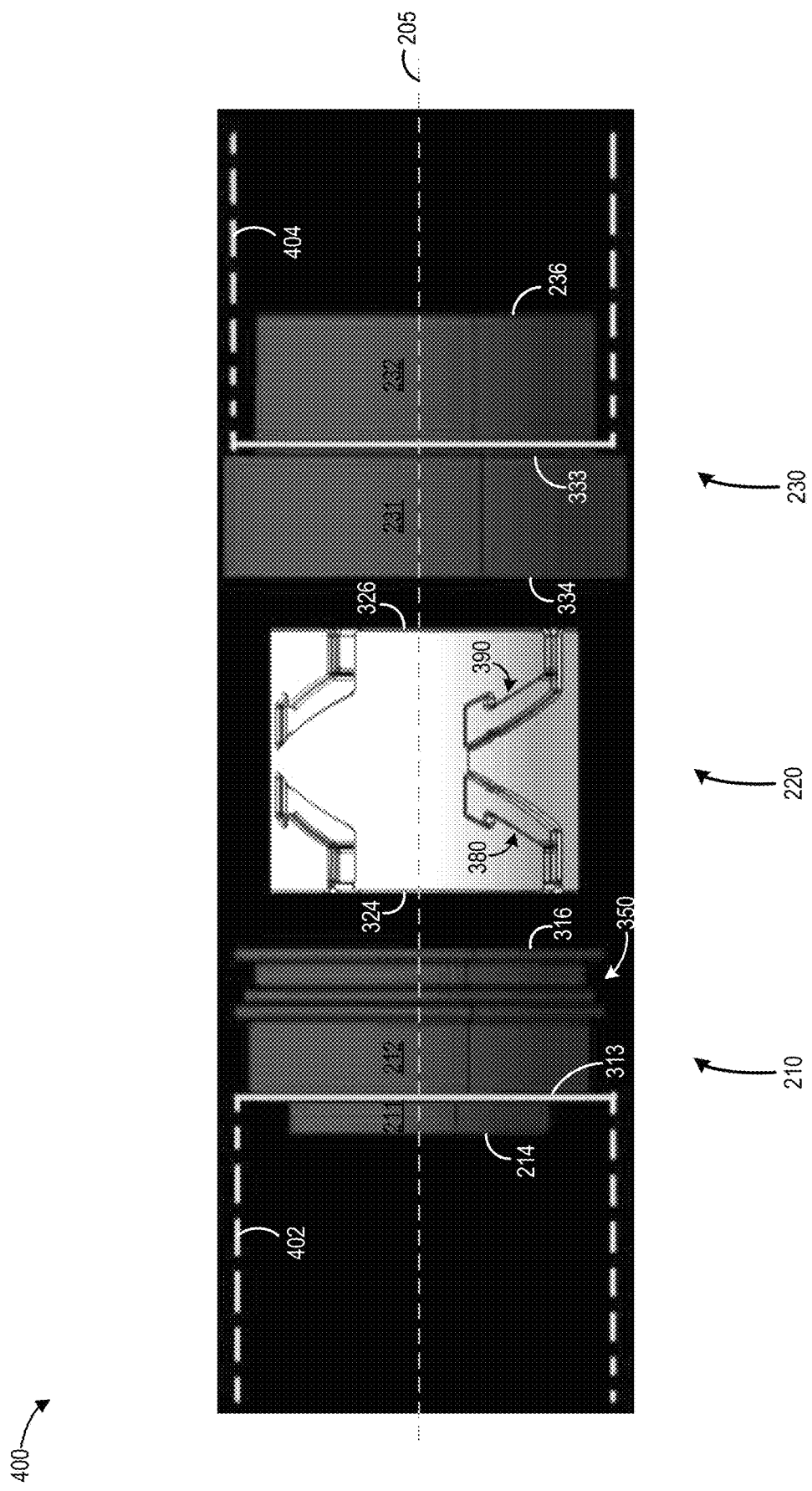
FIG. 4 is a side view of a first, second and third cylindrical pieces of the quick connector of FIG. 3, with the first and third pieces coupled to conduits.
Figure 5:
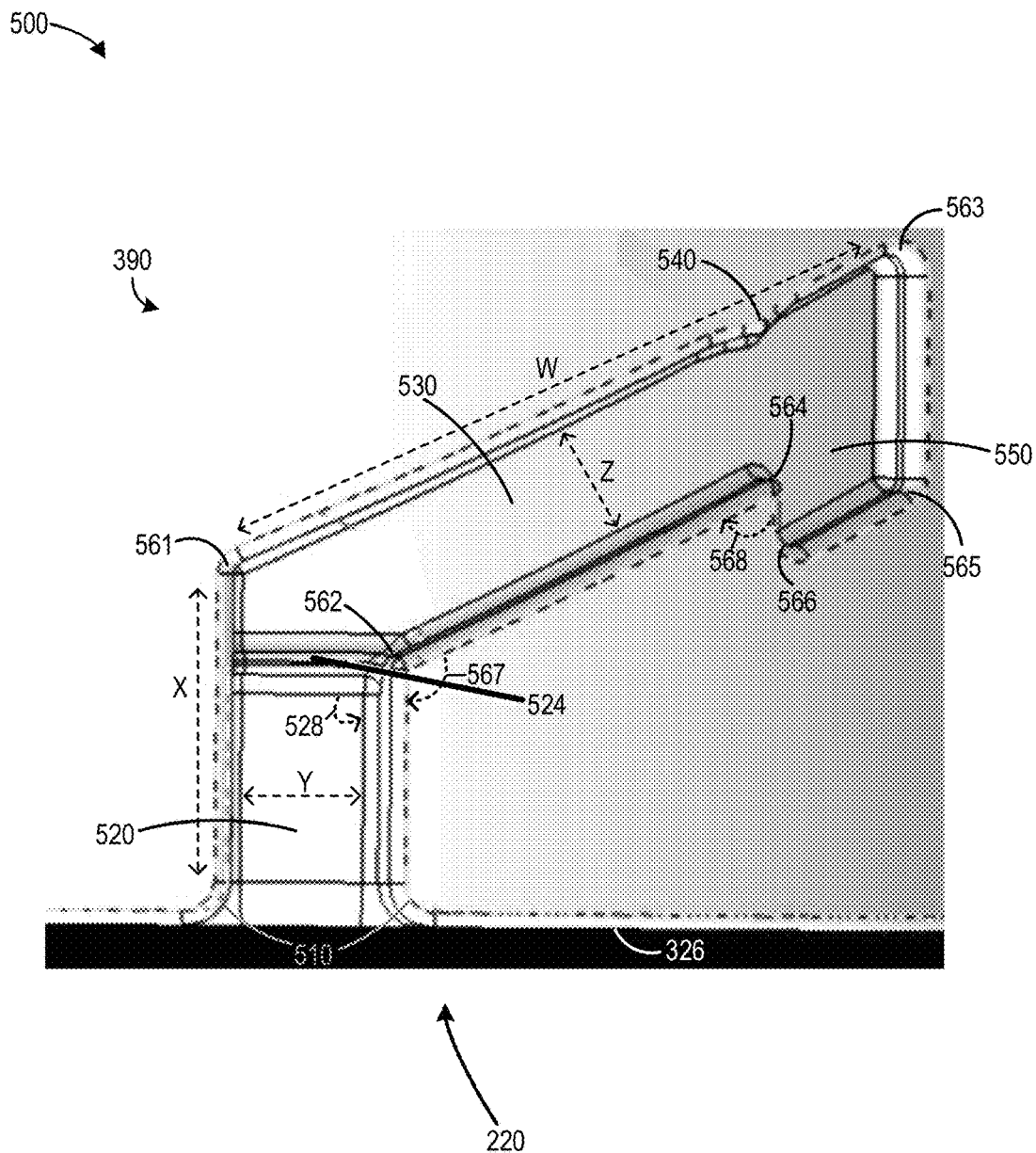
FIG. 5 is a close-up front view of a latching slot from a second slot group of the second cylindrical piece of the quick connector of FIG. 3.
Figure 6:
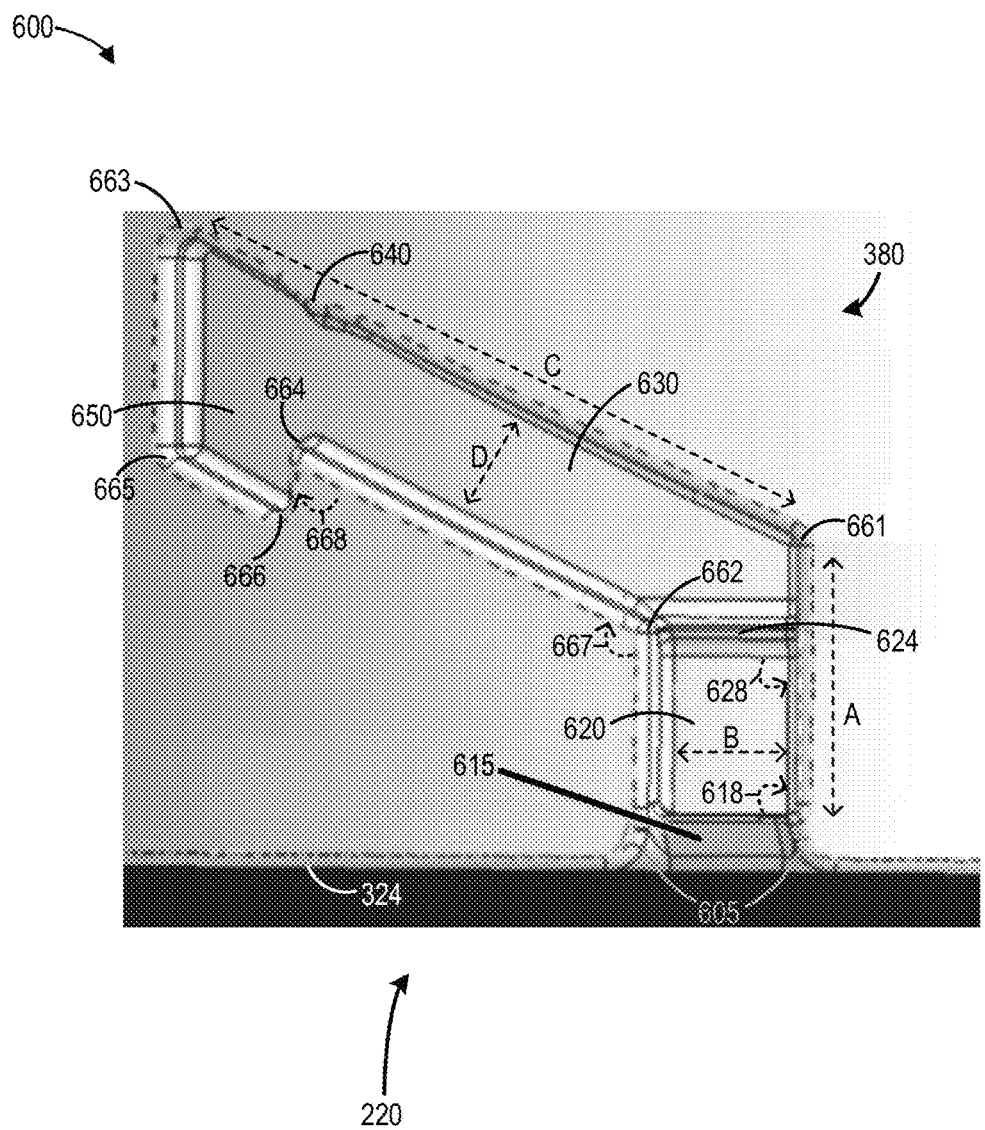
FIG. 6 is a close-up front view of a latching slot from a first slot group of the second cylindrical piece of the quick connector of FIG. 3.
Figure 7:
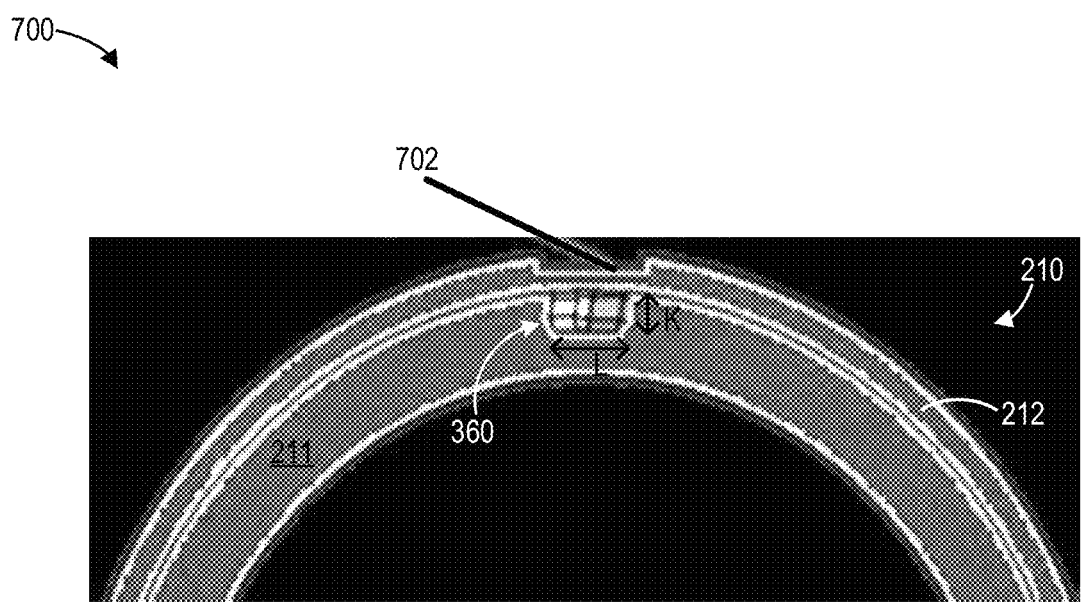
FIG. 7 is an inside view of the first cylindrical piece of the quick connector of FIG. 3.
Figure 8:
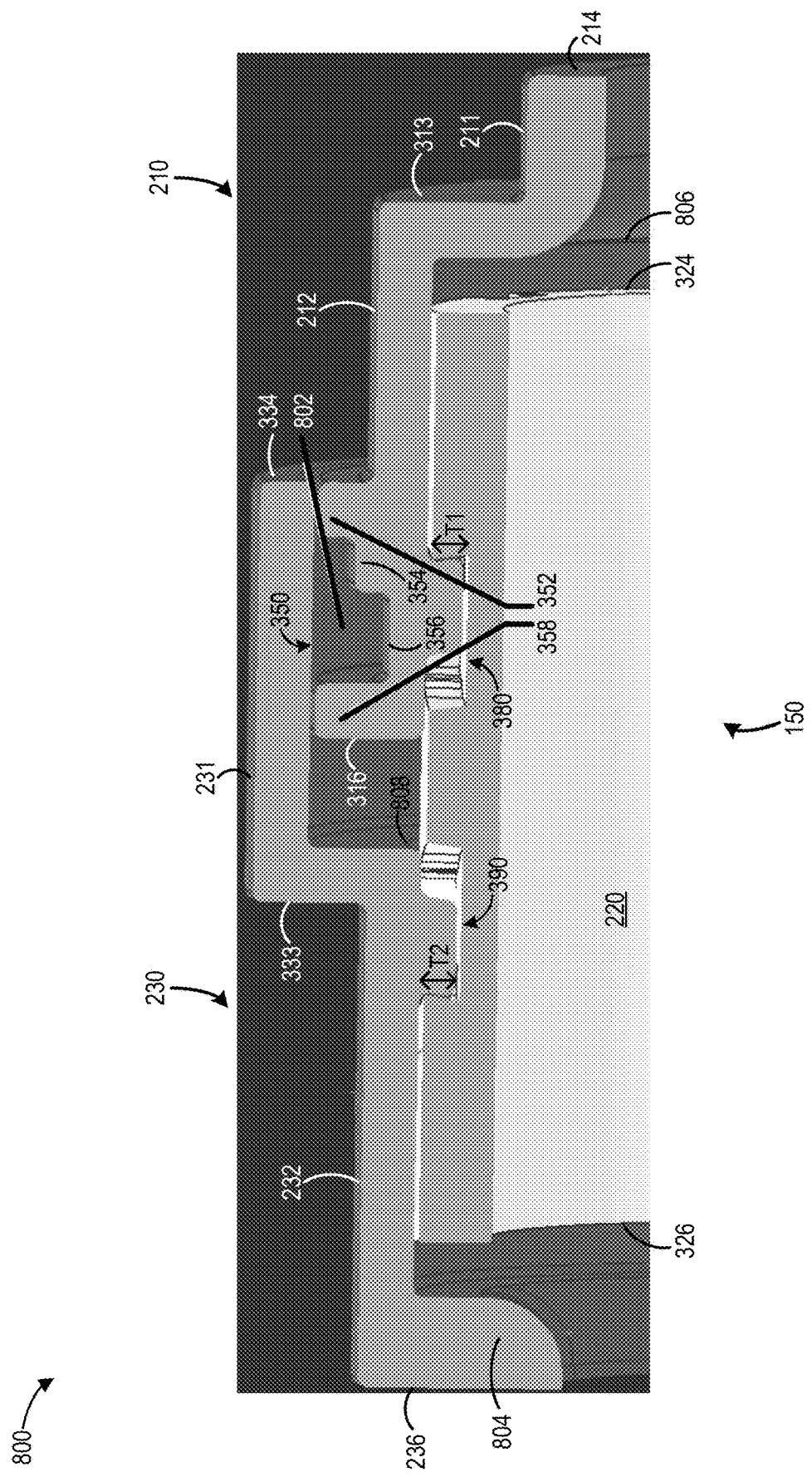
FIG. 8 is a cross-sectional view of the fully assembled quick connector assembly of FIG. 2.
Figure 9:
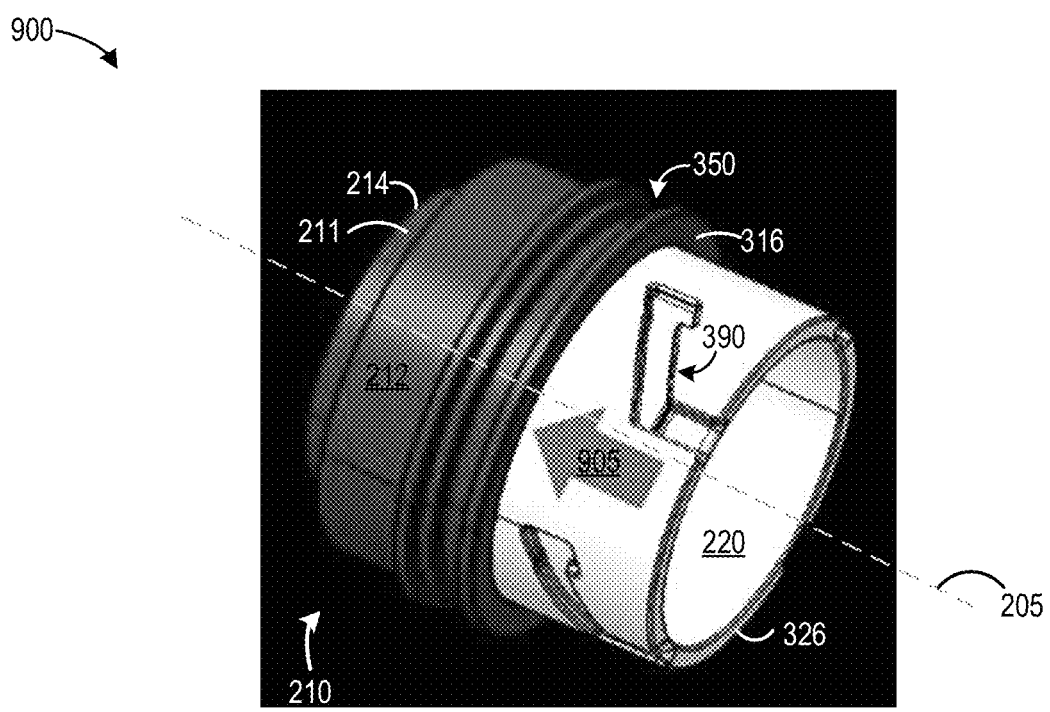
FIG. 9 is a perspective view of a partly assembled first and second cylindrical pieces of the quick connector of FIG. 3.
Figure 10:
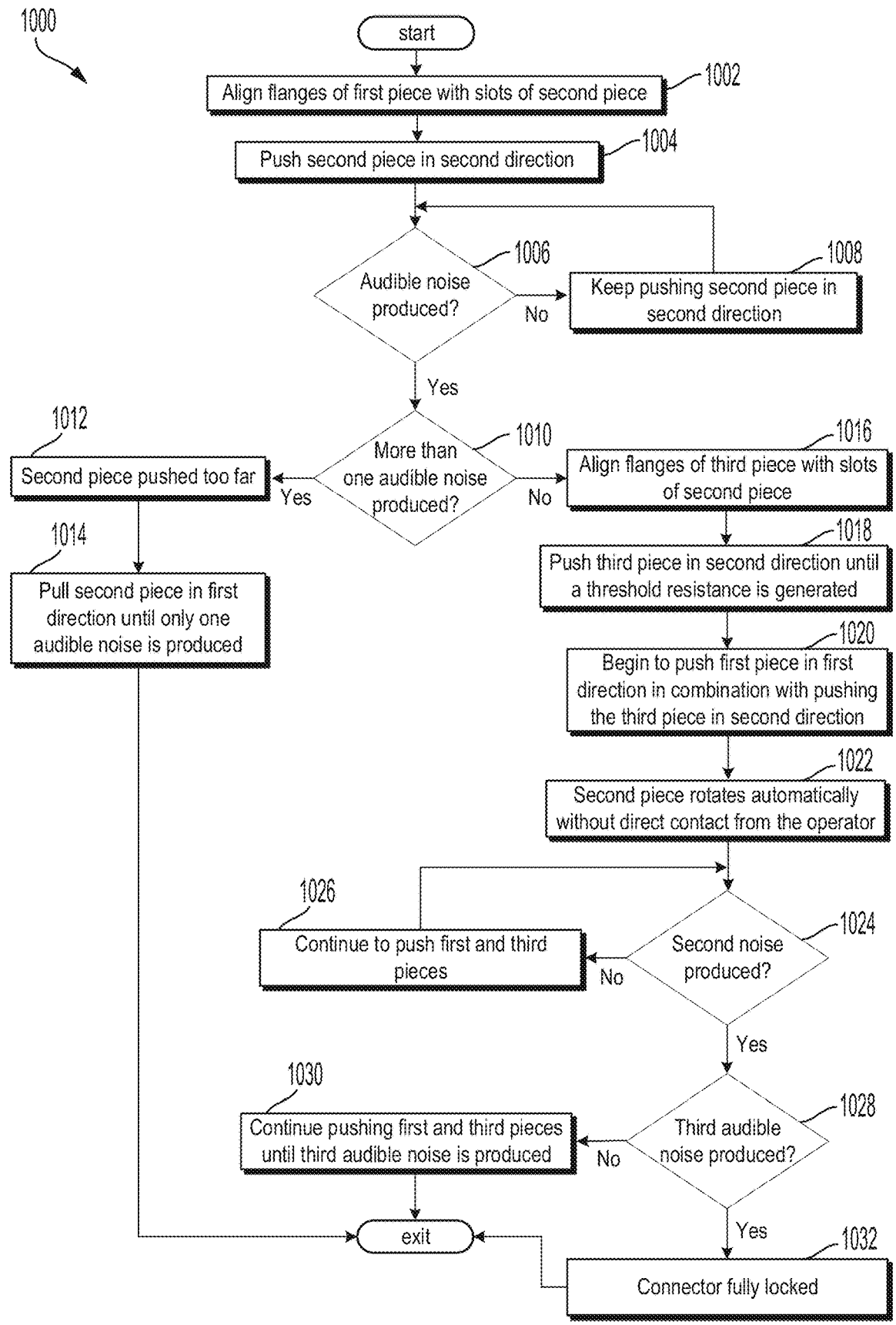
FIG. 10 is a flow-chart of a method for complete coupling of a three-piece quick connector assembly in accordance with an example of the present disclosure.

The following description relates to an example of a quick connector. In one example, the quick connector is a connector for air induction conduits of an automotive engine. An exemplary vehicle including the quick connector in its air intake system is shown in FIG. 1. In FIG. 2, a general perspective view of the fully coupled quick connector is shown. FIG. 3 shows a plurality of component parts of the quick connector. An engagement of three hollow cylindrical pieces constitute a contiguous and uninterrupted interlocked system. FIG. 4 illustrates the parts of the quick connector which make connection with a conduit. FIGS. 5 and 6 show close-up views of latching slots from the two slot groups of the quick connector. FIG. 7 shows an inside view of a first cylindrical piece of the quick connector. FIG. 8 provides a cross-sectional view of the fully assembled quick connector assembly, highlighting a variety of features. In FIG. 9, a general perspective view of a partly assembled quick connector is illustrated. FIG. 10 shows a flow-chart of a method for determining complete coupling of the quick connector.

FIG. 1 shows a perspective view 100 of an exemplary vehicle 104 comprising an air intake system 102. The coordinate axes, X, Y, and Z are provided for reference. The Z axis may be parallel to a gravitational axis. Further, the X axis may be a lateral or horizontal axis and the Y axis may be a longitudinal axis. The vehicle 104 includes an engine hood 110. The engine hood 110 is illustrated in an open position to reveal the components positioned below the hood (e.g., engine 106, engine intake conduit 108, etc.). However, it will be appreciated that the engine hood 110 may be closed to seal an engine compartment 160, when the vehicle 104 is in motion. FIG. 1 also shows a front bumper shell 123 and opposing vehicle side panels 134 of the vehicle's body structure that form a portion of the boundary of the engine compartment 160.

In FIG. 1, an air inlet duct 116 is shown. The air inlet duct 116 may be positioned below a front section 119 of the engine hood 110, when the engine is in the closed position. The air inlet duct 116 provides airflow to an airbox 132. The airbox 132 is configured to flow filtered intake air to an engine intake conduit 108. The engine intake conduit 108 provides air to at least one cylinder in the engine 106. In the illustrated example, the intake conduit 108 is shown to be connected to a charge air cooler 152 via a three-piece quick connector 150. A magnified view 180 of the quick connector 150 in its fully assembled form is also shown in FIG. 1. Although the quick connector 150 is shown here in the context of the air induction system 102 of the exemplary vehicle 104, it will be appreciated that the quick connector 150 may be used to couple two ducts of an exhaust gas circulation system or to couple other conduits configured to supply/release air or other fluids in a vehicle. Furthermore, the quick connector according to the present disclosure may also be used in non-automotive systems, such as in home HVAC systems, etc. The quick connector 150 may be made of plastic or any other suitable material.

FIG. 2 shows a perspective view 200 of the fully assembled quick connector 150 of FIG. 1. The quick connector 150 comprises three hollow cylindrical pieces, a first cylindrical piece 210, a second cylindrical piece 220, and a third cylindrical piece 230. In the perspective view 200, all three components are connected to each other through a locking mechanism to form a contiguous and uninterrupted interlocked sealed system. The quick connector 150 encloses an annular channel through which air or other fluids may pass. A central longitudinal axis 205 of the assembled quick connector is depicted by a dashed line for reference. The three cylindrical pieces of the quick connector 150 are aligned along the central longitudinal axis 205.

Two of the three hollow cylindrical pieces of the quick connector 150 further comprises two cylindrical sections with different diameters that are circumferentially offset from each other. The first cylindrical piece 210 includes a first section 211 and a second section 212. Similarly, the third cylindrical piece 230 includes a first section 231 and a second section 232. Unlike the first and third pieces, the second cylindrical piece 220 includes only one section. In the perspective view 200, the quick connector is fully assembled, such that the second cylindrical piece 220 is completely overlapped by the first cylindrical piece 210 and the third cylindrical piece 230. Additionally, the first section 231 of the third cylindrical piece 230 also overlaps a part of the second section 212 of the first cylindrical piece 210.

The first section 211 of the first cylindrical piece 210 has a diameter, referred to as D1. The second section 212 of the first cylindrical piece 210 and the second section 232 of the third cylindrical piece 230 each have the same diameter, referred to as D2. The first section 231 of the third cylindrical piece 230 has a diameter, referred to as D3. The diameter D1 of section 211 is smaller than the diameter D2 of sections 212 and 232 and D3 of section 231. The diameter D2 of sections 212 and 232 is larger than the diameter D1 of section 211, but smaller than the diameter D3 of section 231. The diameter D3 of section 231 is larger than the diameter D2 of sections 212 and 232 and D1 of section 211. Consequently, the assembled quick connector shows a bulged central panel compared to the two terminal ends with one of the terminal ends having an additional contracted panel.

Furthermore, each section of the three cylindrical pieces has two circumferential edges which will be shown and discussed in detail in FIGS. 3 and 8. In FIG. 2, the assembled quick connector shows a circumferential edge 214 at a first extreme end and another circumferential edge 236 at a second extreme end, opposite the first. The circumferential edge 214 is a part of the first section 211 of the first cylindrical piece 210 and the circumferential edge 236 is a part of the second section 232 of the third cylindrical piece 230.

The perspective view 200 of the assembled quick connector shows a first rib 260, a second rib 270, and a third rib 280. In one example, the second rib 270 may be formed via the overlapping of certain sections of the hollow cylindrical pieces which will be discussed in more detail in FIG. 3. The first rib 260 is a part of the first cylindrical piece 210 and the third rib 280 is a part of the third cylindrical piece 230.

FIG. 3 shows an exploded view 300 of the quick connector 150 of FIG. 2. As such, components previously introduced are numbered similarly in subsequent figures. The three hollow cylindrical pieces of the quick connector comprising geometrical features of the locking mechanism are completely visible in FIG. 3. All the three components, the first cylindrical piece 210, the second cylindrical piece 220, and the third cylindrical piece 230 are aligned along the central longitudinal axis 205.

The first cylindrical piece 210 is a single piece comprising the first section 211 and the second section 212. The first section 211 of the first cylindrical piece 210 further comprises a first circumferential edge 214 and a second circumferential edge (not visible in FIG. 3). Similarly, the second section 212 of the first cylindrical piece 210 comprises a first circumferential edge 313 and a second circumferential edge 316. The first section 211 and the second section 212 are circumferentially offset from each other.

The second section 212 of the first cylindrical piece 210 includes a plurality of flanges 360 on the internal surface. The plurality of flanges 360 lie close to the second circumferential edge 316 of the section 212. In the illustrated example, the flanges 360 are diamond-shaped. In other examples, the flanges 360 may have different shapes, including circular, square, oval, rectangular etc.

Furthermore, the second section 212 of the first cylindrical piece 210 comprises a radial slot 350 on the external surface. The radial slot 350 is positioned close to the second circumferential edge 316 and further comprises a first ridge 352, a second ridge 354, a third ridge 358, and a groove 356. The first ridge 352, the second ridge 354, the third ridge 358, and the groove 356 run all the way around the circumference of the section 212. In the illustrated example, the third ridge 358 makes a direct contact with the circumferential edge 316. The groove 356 is positioned between the second ridge 354 and the third ridge 358. The first ridge 352 makes a face-sharing contact with the second ridge 354. Additionally, both the first ridge 352 and the third ridge 358 may be larger than the second ridge 354 to serve as walls of the radial slot 350.

The second cylindrical piece 220 is a single piece comprising only one section. The second piece 220 further comprises a first circumferential edge 324 and a second circumferential edge 326. The second cylindrical piece 220 has a diameter, referred to as D5. The diameter D5 of the second piece 220 is smaller than the diameter D2 (shown in FIG. 2) of the sections 212 and 232 of the first and third cylindrical pieces, respectively.

The second cylindrical piece 220 includes a first group of latching slots 380 and a second group of latching slots 390 on the external surface. Each slot in the first group of latching slots 380 has a depression thickness T1 and is configured as an angled lane that originates at the first circumferential edge 324 and ends near the central region of the second piece 220. The shape of the first group of latching slots 380 will be explained in detail in FIG. 6. Each slot in the second group of latching slots 390 has a depression thickness T2 and is configured as an angled lane that originates at the second circumferential edge 326 and ends near the central region of the second piece 220. The shape of the second group of latching slots 390 will be explained in detail in FIG. 5. The two groups of latching slots are configured on the second cylindrical piece 220 in a way such that each slot in the first group of latching slots 380 faces the first circumferential edge 324, and each slot in the second group of latching slots 390 faces the second circumferential edge 326, opposite the first. Although the two groups of latching slots face the opposite ends of the cylinder, the first group of latching slots 380 and the second group of latching slots 390 are angled in a same direction.

The plurality of flanges 360 of the first cylindrical piece 210 corresponds to the first group of latching slots 380 of the second cylindrical piece 220 such that the first piece 210 and the second piece 220 may be connected to each other. In one example, the plurality of flanges 360 may be shaped to mate with an end region of the first group of latching slots 380. The thickness of the flanges 360 may be similar to but may not exceed the thickness T1 of the depression of the latching slots 380, so as not to impede fluid flow.

The third cylindrical piece 230 is a single piece comprising the first section 231 and the second section 232. The first section 231 of the third cylindrical piece 230 further comprises a first circumferential edge 334 and a second circumferential edge 333. Similarly, the second section 232 of the third cylindrical piece 230 comprises a first circumferential edge (not visible in FIG. 3) and a second circumferential edge 236. The first section 231 and the second section 232 are circumferentially offset from each other.

Furthermore, the second section 232 of the third cylindrical piece 230 comprises a plurality of flanges on the internal surface (not visible in FIG. 3). The flanges of the third cylindrical piece 230 may be diamond-shaped, similar to the flanges 360 of the first cylindrical piece 210. In some examples, the flanges may have different shapes, such as circular, square, oval, rectangular, etc. The plurality of flanges of the third cylindrical piece 230 corresponds to the second group of latching slots 390 of the second cylindrical piece 220 such that the second piece 220 and the third piece 230 may be connected to each other. In one example, the plurality of flanges of the third cylindrical piece 230 may be shaped to mate with an end region of the second group of latching slots 390. The thickness of the flanges of the third cylindrical piece 230 may be similar to but may not exceed the thickness T2 of the depression of the latching slots 390, so as not to impede fluid flow.

The three interlocking pieces of the quick connector are configured to have a substantially continuous inner diameter, when coupled together. The plurality of flanges 360 of the first cylindrical piece 210 slides and fits into the first group of latching slots 380 of the second cylindrical piece 220, such that the second section 212 of the first cylindrical piece 210 overlaps a portion of the second cylindrical piece 220. The plurality of flanges of the third cylindrical piece 230 slides and fits into the second group of latching slots 390 of the second cylindrical piece 220, such that both the sections 231 and 232 of the third cylindrical piece 230 overlaps the exposed portion of the second cylindrical piece 220. Additionally, the first section 231 of the third cylindrical piece 230 also extends over the radial slot 350 of the second section 212 of the first cylindrical piece 210. Therefore, when the three pieces of the quick connector are interlocked, it forms a substantially smooth interior surface free of gaps, protrusions, or other features that may disrupt air flow through an interior volume of the quick connector.

Said another way, in a fully assembled form of the quick connector, the second cylindrical piece 220 is completely overlapped by the first cylindrical piece 210 and the third cylindrical piece 230. In addition, the third cylindrical piece 230 also extends over the radial slot 350 of the first cylindrical piece 210, such that the radial slot 350 is sandwiched between the second cylindrical piece 220 and the first section 231 of the third cylindrical piece 230, thereby providing a sealed interface. Hence, the interior volume of the fully assembled quick connector, which form a passage through which air may flow, comprises a substantially uniform diameter throughout its length.

Furthermore, the partial overlapping of the second section 212 of the first cylindrical piece 210 and the first section 231 of the third cylindrical piece 230 creates the second rib 270

(shown in FIG. 2) of the fully assembled quick connector 150. The first rib 260 (shown in FIG. 2) of the fully assembled quick connector 150 is created solely by the first circumferential edge 313 of the second section 212 of the first cylindrical piece 210. The third rib 280 (shown in FIG. 2) of the fully assembled quick connector 150 is created solely by the second circumferential edge 333 of the first section 231 of the third cylindrical piece 230.

The size of the hollow cylindrical pieces of the quick connector may be adapted to the size of the conduit to which the quick connector is applied. In some examples, the inner diameter of the quick connector may range from 4-10 cm. It will be appreciated that the inner diameter of the quick connector may be modified based on its application without departing from the scope of the present disclosure. Accordingly, the number of geometrical features (flanges and latching slots) corresponding to the locking mechanism may vary with the diameter of the quick connector as well. In the illustrated example, two to four latching slots for each slot group are indicated on the external surface of the second cylindrical piece 220. Similarly, two to four corresponding flanges are provided on the internal surface of each of the first cylindrical piece 210 and the third cylindrical piece 230. In other examples, the three hollow cylindrical pieces of the quick connector may comprise any number of latching slots and spatially corresponding flanges. However, the number of flanges may be equal to the number of corresponding latching slots for enhanced coupling of two pieces of the quick connector. Additionally, the spacing between two latching slots and the spacing between the two corresponding flanges are designed equally for fully locked assembly of two pieces of the quick connector. This feature provides an even load distribution, which makes it easier to assemble the quick connector. Furthermore, as both the groups of latching slots are located on the second cylindrical piece 220, the tooling of the first cylindrical piece 210 and the third cylindrical piece 230 are simple and cheap.

FIG. 4 shows a side view 400 of the first cylindrical piece 210, the second cylindrical piece 220 and the third cylindrical piece 230 of the quick connector. The three hollow cylindrical pieces are aligned along the central axis 205. As appreciated by FIG. 4, the first section 211 of the first cylindrical piece 210 is connected to a first conduit 402, such that the section 211 fits inside the first conduit 402. The first conduit 402 has a mating surface that couples to the first circumferential edge 313 of the second section 212 of the first cylindrical piece 210. On the other hand, the second section 232 of the third cylindrical piece 230 is connected to a second conduit 404, such that the section 232 fits inside the second conduit 404. The second conduit 404 has a mating surface that couples to the second circumferential edge 333 of the first section 231 of the third cylindrical piece 230.

In one example, the second cylindrical piece 220 does not make contact with any conduits directly. The second cylindrical piece 220 is kept free to engage simultaneously with both the first cylindrical piece 210 and the third cylindrical piece 230, through the locking mechanism described previously in FIG. 3. The second cylindrical piece 220 rotates automatically about the central axis 205 in a first rotational direction, when coupled with both the first cylindrical piece 210 and the third cylindrical piece 230, to lock the quick connector 150. In this way, the first conduit 402 may be connected to the second conduit 404. Similarly, when pulled, the second cylindrical piece 220 rotates automatically about the central axis 205 in a second rotational direction, with the second direction being opposite the first, to uncouple the three cylindrical pieces and unlock the quick connector. In this way, the first conduit 402 may be disconnected from the second conduit 404. More details on the method of assembly of the quick connector will be described in FIG. 10.

The second cylindrical piece 220 being able to auto-rotate not only allows flexibility but also connects two conduits without affecting the orientation of the conduits. In some examples, the first cylindrical piece 210 and the third cylindrical piece 230 of the quick connector may be manufactured separately and embedded into the conduits. In other examples, all three pieces of the quick connector may be manufactured and sold as a three-piece quick connector without any conduit attachment. In one example, the three pieces may be part of a kit.

FIG. 5 shows a close-up, front view 500 of one of the slots from the second group of the latching slots 390 of the second cylindrical piece 220 of the quick connector. The latching slot comprises five joint elements: a pair of guiding curvatures 510, a straight lane 520, an angled lane 530, a haptic bump 540, and a resting notch 550. All five elements of the latching slot are connected and follow a sequence, such that a continuous path is formed.

The pair of guiding curvature 510 serves as the entry point for a corresponding flange. The pair of guiding curvature 510 guides the flange to enter the slot more easily and move to the next element. The guiding curvature 510 leads into the straight lane 520. The straight lane 520 is configured to be perpendicular to the circumferential edge 326. The straight lane 520 has a length X and a width Y. A corresponding flange entering the slot will have a diameter less than the width Y of the straight lane 520 and will travel the length X of the straight lane 520. The straight lane 520 also comprises a radial haptic bump 524. The radial haptic bump 524 is a ridge-like structure which is located near the end of the straight lane 520 and prevents the flange from entering the next element of the slot. This serves as a checkpoint for unintentional locking. The radial haptic bump 524 is perpendicular to the straight lane 520 creating a right angle 528.

A bending of the straight lane 520 at a corner 561 and at a corner 562 creates the angled lane 530. The bending is oriented on right side relative to the straight lane 520 such that, the straight lane 520 and the angled lane 530 comprise an angle of approximately 120 degrees as represented by an angle 567, in the illustrated example. In other examples, the angle 567 may vary ranging from 95 degrees to 160 degrees. The angled lane 530 has a length W and a width Z. The width Z of the angled lane 530 may be smaller than the width Y of the straight lane 520. This feature allows faster installation of the flanges into their corresponding latching slots. The incoming flange is turned at the corner 561 and the corner 562 relative to its original direction of travel and travels along the length W of the angled lane 530. Also, the diameter of the flange may be same as or correspondingly less than the width Z of the angled lane 530. The angled lane 530 will further direct the flange to the next element of the latching slot.

Towards the end of the angled lane 530, the flange meets the haptic bump 540. In the illustrated example, the haptic bump 540 is an axial haptic bump that forms a notch to interfere axially in the path of the flange. In other examples, the haptic bump 540 may be a slightly raised portion in the path of the flange that may form a radial interference. In both cases, the haptic bump 540 allows an operator to feel that the quick connector is fully locked or about to be fully locked. This feature is configured to allow the flange enter easily but needs more effort to disengage. The flange travels through the haptic bump 540 and reaches the resting notch 550. The resting notch 550 is a continuation of the angled lane 530, past the haptic bump 540. A bending of the angled lane 530 at a corner 563 and at a corner 564 creates the resting notch 550. In other embodiments, the haptic bump 540 may be configured as a bump positioned only at the corner 563 or the corner 564. The bending is oriented on right side relative to the angled lane 530 such that, the angled lane 530 and the resting notch 550 comprise an angle of approximately 80 degrees as represented by an angle 568, in the illustrated example. In other examples, the angle 568 may vary ranging from 80 degrees to 160 degrees. A corner 565 and a corner 566 define the boundary of the resting notch 550. When the quick connector is fully assembled, the flange sits in the resting notch 550 after traveling through the other elements of the slot.

FIG. 6 shows a close-up, front view 600 of one of the slots of the first group of latching slots 380 of the second cylindrical piece 220 of the quick connector. The latching slot comprises five joint elements: a pair of guiding curvatures 605, a straight lane 620, an angled lane 630, a haptic bump 640, and a resting notch 650. All five elements of the latching slot are sequentially connected, such that a continuous path is formed.

The pair of guiding curvature 605 serves as the entry point for a corresponding flange. The pair of guiding curvature 605 guides the flange to enter the slot more easily and move to the next element. The pair of guiding curvature 605 leads into the straight lane 620. In the illustrated example, the straight lane 620 is configured to be perpendicular to the circumferential edge 324. The straight lane 620 has a length A and a width B. The corresponding flange entering the slot will have a diameter that is less than the width B of the straight lane 620 and will travel along the length A of the straight lane 620. The straight lane 620 also comprises two additional features, a snapping feature 615 and a radial bump 624. The snapping feature 615 is located near the entrance of the straight lane 620 and may form a ridge-like structure to prevent the flange from falling off. The snapping feature 615 is perpendicular to the straight lane 620 creating a right angle 618. The radial bump 624 is located near the end of the straight lane 620, which prevents the flange from entering the next element of the slot and start locking unintentionally. The radial bump 624 is perpendicular to the straight lane 620 creating a right angle 628. The two additional features of the straight lane 620, discussed above, may be useful in scenarios where the first cylindrical piece 210 and the second cylindrical piece 220 are pre-assembled by supplier and distributed as partially assembled two-piece structure along with the third cylindrical piece 230.

Going back to FIG. 6, a bending of the straight lane 620 at a corner 661 and at a corner 662 creates the angled lane 630. The bending is oriented on left side relative to the straight lane 620 such that, the straight lane 620 and the angled lane 630 comprise an angle of approximately 120 degrees as represented by an angle 667, in the illustrated example. In other examples, the angle 667 may vary ranging from 95 degrees to 160 degrees. The angled lane 630 has a length C and a width D. The width D of the angled lane 630 may be smaller than the width B of the straight lane 620. The incoming flange is turned at the corner 661 and the corner 662 relative to its original direction of travel and travels along the length C of the angled lane 630. Also, the diameter of the flange may be same as or correspondingly less than the width D of the angled lane 630. The angled lane 630 will further direct the flange to the next element of the latching slot.

Towards the end of the angled lane 630, the flange meets the haptic bump 640. In the illustrated example, the haptic bump 640 is an axial haptic bump that forms a notch to interfere axially in the path of the flange. In other examples, the haptic bump 640 may be a slightly raised portion in the path of the flange that may form a radial interference. In both cases, the haptic bump 640 allows an operator to feel that the quick connector is fully locked or about to be fully locked. This feature is configured to allow the flange enter easily but needs more effort to disengage. The flange travels through the haptic bump 640 and reaches the resting notch 650. The resting notch 650 is a continuation of the angled lane 630, past the haptic bump 640. A bending of the angled lane 630 at a corner 663 and at a corner 664 creates the resting notch 650. In other embodiments, the haptic bump 640 may be configured as a bump positioned only at the corner 663 or the corner 664. The bending is oriented on left side relative to the angled lane 630 such that, the angled lane 630 and the resting notch 650 comprise an angle of approximately 80 degrees as represented by an angle 668, in the illustrated example. In other examples, the angle 668 may vary ranging from 80 degrees to 160 degrees. A corner 665 and a corner 666 define the boundary of the resting notch 650. When the quick connector is assembled fully, the flange sits in the resting notch 650 after traveling through the other elements of the slot.

FIG. 7 shows an inside view 700 of the first cylindrical piece 210 of the quick connector. One of the flanges of the plurality of flanges 360 is visible on the internal surface of the second section 212. As described previously in FIG. 3, each flange in the plurality of flanges 360 is diamond-shaped in the illustrated example. However, in other examples, the plurality of flanges 360 may have different shapes, including circular, square, oval, rectangular, etc. Each flange has a width/diameter L and a thickness K. The first cylindrical piece 210 uses the plurality of flanges 360 to couple to the second cylindrical piece 220.

FIG. 7 also highlights an aligning feature of the quick connector. The aligning features serve as visual indicators for the full assembly of the quick connector. As appreciated by FIG. 7, a first aligning feature 702 is located on the external surface of the section 212, above one of the flanges of the plurality of flanges 360. The first aligning feature 702 forms a slight depression on the external surface of the section 212 of the first cylindrical piece 210. Similarly, a second aligning feature (not shown) is located on the external surface of the section 231 of the third cylindrical piece 230. The second aligning feature also forms a slight depression on the external surface of the section 231, above one of the flanges of the plurality of flanges. When the quick connector is fully assembled with the three cylindrical pieces interlocked, both the first aligning feature 702 and the second aligning feature match between each other. The proper alignment of the aligning features indicates full assembly of the quick connector.

FIG. 8 shows a cross-sectional view 800 of the fully assembled quick connector. As appreciated by FIG. 8, the three hollow cylindrical pieces are interlocked such that both the first cylindrical piece 210 and the third cylindrical piece 230 completely overlap the second cylindrical piece 220. Additionally, the section 231 of the third cylindrical piece 230 also extends over the radial slot 350 of the first cylindrical piece 210. This overlapping between the first cylindrical piece 210 and the third cylindrical piece 230 not only provides a sealing interface but also helps reduce the total axial length of the quick connector that is required to be included for coupling conduits.

As shown in FIG. 8, a seal 802 rests in the radial slot 350 of the first cylindrical piece 210. The seal 802 is positioned radially between the first ridge 352 and the third ridge 358, such that the seal 802 rests on the groove 356. The seal 802 runs all the way around the circumference of the radial slot 350. Furthermore, the first ridge 352 and the third ridge 358 of the radial slot 350 serve as protective walls on each side of the seal 802 to protect it from external agents that can reduce seal durability. In some examples, the seal 802 may be manufactured separately and assembled into the radial slot 350 by supplier. In other embodiments, the seal 802 may be integrally molded into the radial slot 350, thereby reducing complexity, costs and the risk of the seal falling off before full assembly of the quick connector.

This method of sealing allows air or other fluids to flow only through the interior passage of the system. This sealing method also allows the quick connector to withstand higher air pressures in the conduit, without compromising its assembly process. Since there is only one sealing interface in this quick connector that interferes between the first cylindrical piece 210 and the third cylindrical piece 230, this method of sealing is more controllable compared to other connectors which have two or more sealing interfaces. This sealing method also allows the second cylindrical piece 220 to rotate automatically without friction against the seal, without direct contact from the operator. Moreover, the operator's visual focus can be directed to just one area during the assembly process of the quick connector with only one sealing interface as opposed to the connectors having two or more sealing interfaces.

As shown in FIG. 8, in a fully assembled quick connector, the hollow region of the second cylindrical piece 220 mainly constitutes the interior volume of the quick connector forming a passage through which air or other fluids may flow. The interior volume of the quick connector comprises a substantially uniform diameter throughout its length. In this configuration of the quick connector, the total radial dimension is smaller compared to other connectors available in the market. However, in other examples, the total radial dimension of the quick connector of the present disclosure may be modified to match the radial dimension of other connectors.

In FIG. 8, the second circumferential edge 806 of the first section 211 of the first cylindrical piece 210 is visible. The cross-sectional view 800 in FIG. 8 also shows the first circumferential edge 808 of the second section 232 of the third cylindrical piece 230. In the illustrated example, the second circumferential edge 236 of the second section 232 of the third cylindrical piece 230 comprises an extended portion 804. When the three pieces of the quick connector are interlocked, the extended portion 804 covers the circumferential edge 326 of the second cylindrical piece 220 to provide a sealed environment free of leaks.

FIG. 9 shows a perspective view 900 of a partly assembled quick connector with the first cylindrical piece 210 and the second cylindrical piece 220 aligned along the central axis 205. The first cylindrical piece 210 and the second cylindrical piece 220 are shown connected such that the second section 212 of the first cylindrical piece 210 partially overlaps the second cylindrical piece 220. Each flange in the plurality of flanges 360 of the first cylindrical piece 210 is present in its corresponding slot in the first group of latching slots 380 of the second cylindrical piece 220. Pushing (as indicated by an arrow 905) the second cylindrical piece 220 into the first cylindrical piece 210 will allow the flanges to travel all the way through their respective slots and reach the radial bump.

Adding the third cylindrical piece 230 to FIG. 9 leads to the full assembly of the quick connector as shown in FIG. 2. In one example, when a simultaneous force is applied on the first piece 210 in a first direction and on the third piece 230 in a second direction, the second piece 220 may rotate automatically without direct contact from the operator. A detailed description of the method of assembly of the first cylindrical piece 210, the second cylindrical piece 220, and the third cylindrical piece 230 will be presented in FIG. 10.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 10 illustrates an example method 1000 for the quick connector assembly. The method 1000 is conducted by only one operator. In one example, the operator may have limited access to the component during the execution of method 1000. However, the alignment features and haptic feedback of the quick connector may allow the operator to fully assemble the quick connector with positive feedback, thereby decreasing the need for increased access to the quick connector.

At step 1002, the method includes holding the first cylindrical piece with one hand and holding the second cylindrical piece with the other hand. Locate the aligning feature and the flanges on the first cylindrical piece and align with the corresponding latching slots on the second cylindrical piece. At step 1004, the method includes pushing the second cylindrical piece into the first cylindrical piece in a second direction until the flanges of the first cylindrical piece travel through the snapping feature of the latching slots of the second cylindrical piece.

At step 1006, it is determined if the flanges of the first cylindrical piece traveled through the snapping feature of the second cylindrical piece and whether a corresponding audible noise is produced. At 1006, if no noise is produced, go to 1008, which includes continuing to push the second piece into the first piece in the second direction. If an audible noise is produced, then go to step 1010.

At step 1010, it will be determined if more than one audible noise is produced and whether the flanges of the first piece are present between the snapping feature and the haptic bump of the latching slots of the second piece. At 1010, if more than one audible noise is produced, go to 1012, which indicates that the second piece is pushed too far and the flanges may have traveled all the way through the haptic bump. In this case, go to 1014. At step 1014, the second cylindrical piece may be pulled in a first direction until it is properly positioned and only one audible noise is produced. This ensures that the flanges of the first cylindrical piece are properly positioned between the snapping feature and the haptic bump of the second cylindrical piece. This creates a partial assembly of the first and second cylindrical pieces. At 1010, if no more than one audible noise is produced, then go to 1016.

At step 1016, the method may include holding the partially-assembled first and second pieces with one hand and the third cylindrical piece with the other hand. Additionally, the method may include locating the aligning feature and the flanges of the third cylindrical piece and aligning them with the corresponding latching slots of the second cylindrical piece.

At step 1018, the method may involve pushing the third cylindrical piece into the second cylindrical piece in a second direction until a threshold resistance is generated. This creates a partly-assembled first, second and third pieces.

At step 1020, begin to push the first piece in a first direction in combination with pushing the third piece in a second direction, such that both the first and third pieces are pushed against the second piece, simultaneously.

Subsequently, at step 1022, the second piece starts to rotate automatically without direct contact from the operator and without causing the rotation of the first and third pieces.

At step 1024, it is determined if the flanges of the first piece traveled through the haptic bump of the slots of the second piece and whether a corresponding second audible noise is produced. At 1024, if no second audible noise is produced, go to 1026, which includes continuing to push the first and third pieces against the second piece. If a second audible noise is produced at 1024, the method will proceed to step 1028.

At 1028, it is determined if the flanges of the third piece traveled through the haptic bump of the slots of the second piece and whether a corresponding third audible noise is produced. At 1028, if no third audible noise is produced, go to 1030, which includes continuing to push the first and third pieces against the second piece until third audible noise is produced. If a third audible noise is produced at 1028, the method will proceed to step 1032. In some examples, the second audible noise at 1024, and the third audible noise at 1028 may occur simultaneously. In other examples, the second and third audible noises may occur one after the other within a gap of fraction of seconds.

At 1032, the three-piece quick connector is fully assembled with the second cylindrical piece locked against the first and third cylindrical pieces. The second piece provides resistance and stops rotating. The flanges are positioned in the resting notches of their respective slots. A part of the third piece extends over the radial slot of the first piece to provide a sealing interface. Additionally, a matching of the aligning features provides a visual confirmation of the full assembly of the quick connector.

As described above, a coupler comprising a first piece including a radial slot and a first protrusion group, a second piece including a first slot group and a second slot group angled in a same direction, the first slot group is counterpart to the first protrusion group, and a third piece including a second protrusion group counterpart to the second slot group, where each slot of the first slot group faces a first side, and each slot of the second slot group faces an opposing, second side is provided. In some examples, one or more of, or each of, the first, second, and third pieces of the coupler is cylindrical and/or hollow.

In some examples, the first slot group of the second piece may include an angled slot with respect to a central axis, and the second slot group of the second piece may also include an angled slot with respect to the central axis and angled in a same direction to the angled slot of the first slot group.

As described, the angled slots of the first slot group and second slot group may further include a straight lane parallel to the central axis. In some examples, the straight lanes of only one of the groups may include one or more bumps. Additionally, the angled slots of the first slot group and the second slot group may include a resting notch at ends thereof. In some examples, one of the groups of slots may be on a recessed surface and the other of the groups of slots may not be on a recessed surface of the piece. Further, the groups of slots may be equally spaced radially around the second piece.

As described, the angled slots may be at identical angles with respect to the central axis such that when the first and third pieces are restrained from rotating they may both couple simultaneously with the second piece via only axial displacement. In some examples, the second piece may rotate during the simultaneous coupling.

As described, the first and third pieces of the coupler may be comprised of plastic. In some examples, the first piece and the third piece may directly be coupled to an air induction system of a vehicle.

As another example, a system for an on-highway vehicle is provided including an engine compartment having an engine mounted therein, and an air induction system coupled with the engine and positioned in the engine compartment. The air induction system may further comprise an air passage having a cylindrical hollow coupler, the coupler including a first piece having a radial slot and a first protrusion group, a second piece having a first slot group and a second slot group angled in a same direction, the first slot group is counterpart to the first protrusion group, and a third piece having a second protrusion group counterpart to the second slot group, where each slot of the first slot group faces a first side, and each slot of the second slot group faces an opposing, second side. In some examples, the first slot group may include an angled slot with respect to a central axis, and the second slot group may also include an angled slot with respect to the central axis and angled in a same direction to the angled slot of the first slot group. The angled slots of the first slot group and second slot group may include a straight lane parallel to the central axis. The straight lanes of only one of the groups may include one or more bumps. As described, the angled slots of the first and second slot groups may include a resting notch at ends thereof. Additionally, the angled slots may be at identical angles with respect to the central axis such that when the first and third pieces are restrained from rotating they may both couple simultaneously with the second piece via only axial displacement. Further, the second piece may rotate during the simultaneous coupling.

As another example, a method of coupling a first and second air induction passages of an automotive engine air induction system is provided. For example, the method may include coupling the first and second air induction passages via a central coupler, the first passage and second passage each having a plurality of protrusions, and the central coupler having a first and second groups of angled slots angled in a same direction, the angled slots of the first and second slot groups face opposite ends of the central coupler, the coupling occurs via axial displacement without rotation of the first and second passages. The method may further comprise an audible and/or a physical haptic feedback upon completion of the connections.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The technology may also be used outside of the automotive industry, such as in home HVAC systems. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A coupler for an air intake system of an internal combustion engine, comprising: the coupler of the air intake system having: a first piece including a radial slot and a first protrusion group; a second piece including a first slot group and a second slot group angled in a same direction, the first slot group is counterpart to the first protrusion group; and a third piece including a second protrusion group counterpart to the second slot group, where each slot of the first slot group faces a first side, and each slot of the second slot group faces an opposing, second side, wherein the first slot group includes an angled slot with respect to a central axis, and wherein the second slot group includes an angled slot with respect to the central axis and angled in a same direction to the angled slot of the first slot group.

2. The coupler of claim 1, wherein one or more of, or each of, the first, second, and third pieces is cylindrical and/or hollow.

3. The coupling of claim 1, wherein the angled slots of the first slot group and second slot group include a straight lane parallel to the central axis.

4. The coupling of claim 3, wherein the angled slots are at identical angles with respect to the central axis such that when the first and third pieces are restrained from rotating they can both couple simultaneously with the second piece via only axial displacement.

5. The coupling of claim 4, wherein the second piece rotates during the simultaneous coupling.

6. The coupling of claim 5, wherein the straight lanes of only one of the groups includes one or more bumps.

7. The coupling of claim 1, wherein the first piece and the third piece are directly coupled to an air induction system of a vehicle.

8. The coupling of claim 1, wherein the first and third pieces are comprised of plastic.

9. The coupling of claim 1, wherein the angled slots of the first slot group and second slot group include a resting notch at ends thereof.

10. The coupling of claim 1, wherein a section of the third piece overlaps the radial slot of the first piece.

11. The coupling of claim 1, wherein the one of the groups of slots is on a recessed surface and the other of the groups of slots is not on a recessed surface of the second piece.

12. The coupling of claim 1, wherein the groups of slots are equally spaced radially around the second piece.

13. A system for an on-highway vehicle, comprising:
an engine compartment having an engine mounted therein;
an air induction system coupled with the engine and positioned in the engine compartment, the air induction system comprising an air passage having a cylindrical hollow coupler, the coupler including:
a first piece including a radial slot and a first protrusion group;
a second piece including a first slot group and a second slot group angled in a same direction, the first slot group is counterpart to the first protrusion group; and
a third piece including a second protrusion group counterpart to the second slot group, where each slot of the first slot group faces a first side, and each slot of the second slot group faces an opposing, second side, wherein the first slot group includes an angled slot with respect to a central axis, and wherein the second slot group includes an angled slot with respect to the central axis and angled in a same direction to the angled slot of the first slot group, wherein the angled slots of the first slot group and second slot group include a straight lane parallel to the central axis, and wherein the angled slots are at identical angles with respect to the central axis such that when the first and third pieces are restrained from rotating they can both couple simultaneously with the second piece via only axial displacement.

14. The system of claim 13, wherein the second piece rotates during the simultaneous coupling.

15. The system of claim 14, wherein the straight lanes of only one of the groups includes one or more bumps.

16. The system of claim 15, wherein the angled slots of the first and second slot groups include a resting notch at ends thereof.

17. A method of coupling a first and second air induction passages of an automotive engine air induction system, comprising: coupling the first and second passages via a central coupler, the first passage and second passage each having a plurality of protrusions, and the central coupler having a first and second groups of angled slots angled in a same direction, the first and second slot groups have angled slots that face opposite ends of the central coupler, the coupling occurs via axial displacement without rotation of the first and second passages but only with rotation of the central coupler.

18. The method of claim 17, further comprising an audible and/or a physical haptic feedback upon completion of the connections.

* * * * *